US006963923B1

(12) United States Patent
Bennett

(10) Patent No.: US 6,963,923 B1
(45) Date of Patent: Nov. 8, 2005

(54) METHOD FOR FILE TRANSFER RESTARTS USING STANDARD INTERNET PROTOCOL

(75) Inventor: Craig Alan Bennett, Williamson, TX (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 08/797,079

(22) Filed: Feb. 10, 1997

(51) Int. Cl.[7] .............................................. G06F 13/00
(52) U.S. Cl. ....................................... 709/232; 709/237
(58) Field of Search ................................ 709/230, 232, 709/237

(56) References Cited

U.S. PATENT DOCUMENTS

| 5,050,166 | A | * | 9/1991 | Cantoni et al. ............. 370/473 |
| 5,446,888 | A | * | 8/1995 | Pyne ............................. 707/10 |
| 5,452,356 | A | * | 9/1995 | Albert ............................ 380/9 |
| 5,506,945 | A |   | 4/1996 | Coutand ..................... 395/114 |
| 5,553,083 | A |   | 9/1996 | Miller ......................... 714/748 |
| 5,579,239 | A |   | 11/1996 | Freeman et al. .............. 348/14 |
| 5,689,825 | A | * | 11/1997 | Averbuch et al. ........... 455/575 |
| 5,737,599 | A | * | 4/1998 | Rowe et al. ................. 707/104 |
| 5,857,203 | A | * | 1/1999 | Kauffman et al. .......... 707/200 |
| 5,870,610 | A | * | 2/1999 | Beyda ............................ 713/1 |

OTHER PUBLICATIONS

"ftpd", Hewlett-Packard, Aug. 1992. (retrieved from www.spi.org Jul. 29, 1999).*

"Client/Server-based file transmission Checkpoint/Restart protocol", IBM TDB v38 n9 Sep. 1995 p191-194. (retrieved from www.spi.org Jul. 29, 1999).*
"Personal Computer Information Exchange Interface", IBM TDB Jan. 1986 p. 3613-3614. (retrieved from www.spi.org Jul. 29, 1999).*
"Application to Host File Transfer Restart Method", IBM TDB Oct. 1988 p. 409-410. (retrieved from www.spi.org Jul. 29, 1999).*

\* cited by examiner

*Primary Examiner*—Dung C. Dinh
(74) *Attorney, Agent, or Firm*—Duke W. Yee; Jeffrey S. LaBaw; Stephen R. Tkacs

(57) ABSTRACT

A method of downloading a file from a Internet server to an Internet client, preferably without action by the Internet client. The method begins by associating the file into a set of components at the server. A profile of the file is then generated. This profile includes identifying information for the file as well as for each component thereof. Such information preferably includes an identifier, a size value, and a code uniquely identifying the component. The file is transferred by initiating a download sequence by which each component is transferred, one-by-one, from the server to the client using an Internet protocol. When the download sequence is complete, the individual components are reassembled into the file using the profile without action by the Internet client. If the transmission is interrupted for any reason, the download sequence is restarted with the component affected by the interruption. This avoids the need to retransfer the entire file.

3 Claims, 5 Drawing Sheets

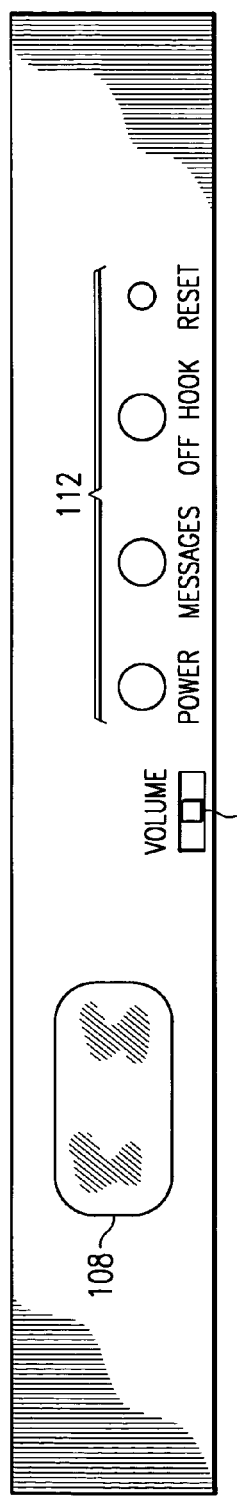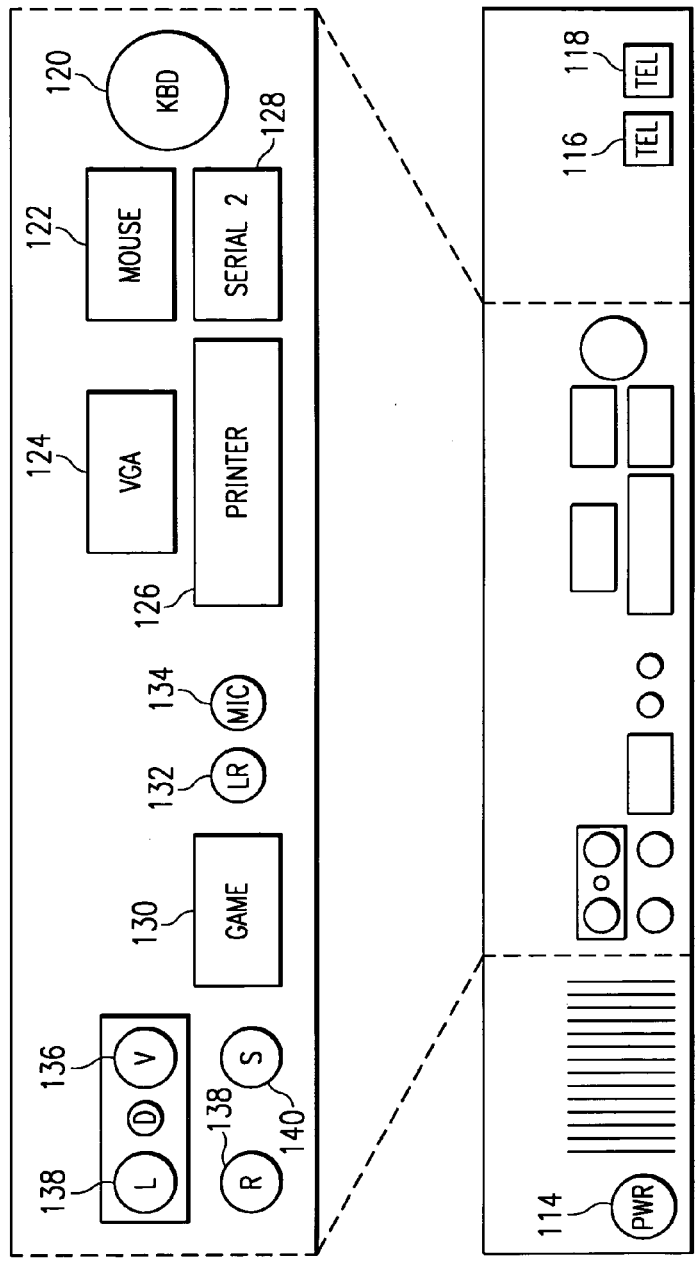

Profile:
Contents Of CONFIG.SYS.PRO:

```
C CONFIG.SYS {Date/Time} {Size} {CRC}   ~252
S CONFIG.SYS.1 {Size} {CRC}
S CONFIG.SYS.2 {Size} {CRC}   >254
S CONFIG.SYS.3 {Size} {CRC}
```
—250

Date\Time  —  DOS Time t Format (Unsigned Long)
Size       —  32-Bit Size Of The File (Unsigned Long)
CRC        —  32-Bit CRC NOTE: All Numeric Fields Are Stored As Hex Char Strings

METHOD FOR FILE TRANSFER RESTARTS USING STANDARD INTERNET PROTOCOL

TECHNICAL FIELD

The present invention relates generally to computer networks and more particularly to the efficient transfer of relatively large computer files over the Internet using standard Internet protocols.

BACKGROUND OF THE INVENTION

The Internet offers a suite well-known services including one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system. The File Transfer Protocol (FTP) is a mechanism for transferring files from a server to a client. Typically, the client includes an FTP interface and appropriate software to control transfer and decompression of the received file.

There has been great interest in providing Internet access at minimal economic cost. While most computers now are pre-configured for Internet access, a significant percentage of households still do not have a personal computer. Thus, it has now been proposed to provide a data processing system that, much like a VCR, may be connected to a television set and used in lieu of a personal computer to provide Web access through a conventional remote control device associated with the system unit. Such a system enables the television to become, in effect, a "Web" appliance. The viewer can rapidly switch between conventional television and Internet access using the remote control unit. All of the conventional "Internet" access tools and navigational functions are preferably "built-in" to the system and thus hidden to the user.

It would also be desirable to update software running on the Web appliance without interaction or even the knowledge of the user. This goal, however, cannot be achieved reliably and cheaply because FTP and other Internet protocols do not allow file transfer restarts. A file transfer "restart" means that the transfer is re-initiated at a point of interruption. Thus, in the event that a conventional FTP file transmission were interrupted, e.g., due to a power outage or other such event, it is necessary to retransfer the entire file. This is highly impractical with very large files across a typical 28.8 Kbs modem, especially without user interaction.

The present invention addresses and solves this problem.

BRIEF SUMMARY OF THE INVENTION

It is thus a primary goal of the present invention to provide a file transfer mechanism that uses conventional FTP but that allows for file transfer restarts.

It is a further object of the invention to update software running on a Web appliance transparently to the user by downloading a file from an Internet server to the appliance.

It is yet another object of the invention to provide a checkpointable method for downloading files across the Internet.

It is still another object of the invention to implement a file transfer download over the Internet by repeatedly transferring a discrete piece of a file as an atomic operation and then reassembling the discrete pieces at the client, preferably without direct user intervention.

It is still another object of the invention to provide a method of downloading a file over the Internet without a proprietary protocol but which still allows for file transfer restarts in the event of transmission interruption.

It is a more general object of the invention to enhance the ease with which software is downloaded over the Internet.

These and other objects of the invention are provided in a method of downloading a file from a Internet server to an Internet client, preferably without interaction by a user of the Internet client. The method begins by breaking the file into a set of components. Then, a profile is generated for the file that includes identifying information for the file and for each component thereof. The identifying information may include an identifier, a size value, and a code uniquely identifying the file and/or component thereof. To transfer the file, a download sequence is initiated by which each component is transferred, one-by-one, from the server to the client. Preferably, the transfer of each component is achieved using conventional Internet FTP. When the download sequence is complete, the components are reassembled. If the download sequence were interrupted for any reason, it is restarted at the point of interruption, as opposed to requiring retransmission of previously-delivered components. Preferably, the components of the file are transferred in a sequential order as determined by the profile.

Preferably, the file profile is transmitted from the server to the client prior to initiation and, if necessary, any restart(s) of the download sequence. The profile is then used to verify whether components received at the client are "complete." Thus, for example, upon receipt at the client of a component, the identifying information is used to verify whether a complete version of the component has been transferred from the server. Typically, this is accomplished by comparing the size of the component with the expected size (as determined by the size value in the profile) and by calculating the code and comparing it to the code in the profile. If the complete version of the component has not been transferred (as determined by one or both of these tests), the profile is resent and the download sequence is restarted, beginning with the component whose transmission was incomplete. When the server completes the download, the client-resident code verifies whether a complete version of the file has been transferred using the identifying information for the file. If the complete version of the file has been transferred, the components thereof are then reassembled into the file.

In the preferred embodiment, the Internet client is a Web appliance and the file is a updated version of a program (e.g., a browser) running on the Web appliance.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 2B is a pictorial representation of a front panel of the data processing system unit;

FIG. 2C is a pictorial representation of a rear panel of the data processing system unit;

DETAILED DESCRIPTION

Figure 1:
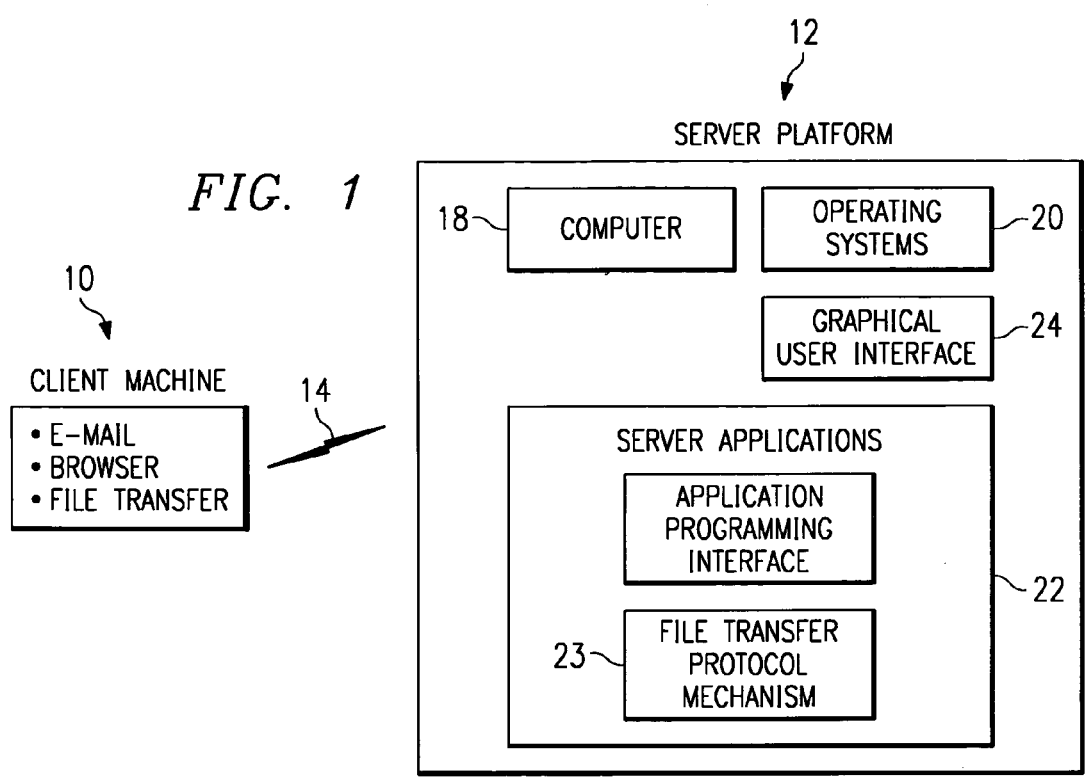
FIG. 1 is a representative system in which the present invention is implemented.

A representative system in which the present invention is implemented is illustrated in FIG. 1. An Internet client machine 10 is connected to a server platform 12 via a communication channel 14. For illustrative purposes, channel 14 is the Internet, an Intranet or other known connection. In the case of the Internet, server platform 12 is one of a plurality of servers which are accessible by clients, one of which is illustrated by machine 10. A client machine typically includes a suite of known Internet tools 16 access the servers of the network and thus obtain certain services. These services include one-to-one messaging (e-mail), one-to-many messaging (bulletin board), on-line chat, file transfer and browsing. Various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system. The File Transfer Protocol (FTP) is a mechanism for transferring files from a server to a client. Typically, the client includes an FTP interface and associated code to facilitate the transfer and, if needed, decompression of the received file. Appropriate code is also resident on the server side of a particular connection (at a so-called "FTP site").

By way of example only, a client machine is a personal computer such as a desktop of notebook computer, e.g., an IBM® or IBM-compatible machine running under the OS/2® operating system, an IBM ThinkPad® machine, or some other Intel x86 or Pentium®-based computer running Windows 3.1 or greater operating system. A representative server platform 12 comprises an IBM RISC System/6000 computer 18 (a reduced instruction set of so-called RISC-based workstation) running the AIX (Advanced Interactive Executive Version 4.1 and above) Operating System 20 and a server program 22. For the purposes of the present invention, the server program 22 supports FTP in a known manner, using FTP mechanism 23 and thus the server platform 12 is an FTP site. FTP is a TCP/IP protocol for file transfers. Information about the FTP protocol may be obtained from Request For Comment (RFC) 765 (October 1985), which is incorporated herein by reference. The platform 12 also includes a graphical user interface (GUI) 24 for management and administration. It may also include an application programming interface (API). The various models of the RISC-based computers are described in many publications of the IBM Corporation, for example, *RISC System/6000, 7013 and 7016 POWERstation and POWERserver Hardware Technical Reference*, Order No. SA23-2644-00. AIX OS is described in *AIX Operating System Technical Reference*, published by IBM Corporation, First Edition (November 1985), and other publications. While the above platform is useful, any other suitable hardware/operating system/server combinations may be used.

Figure 2A:
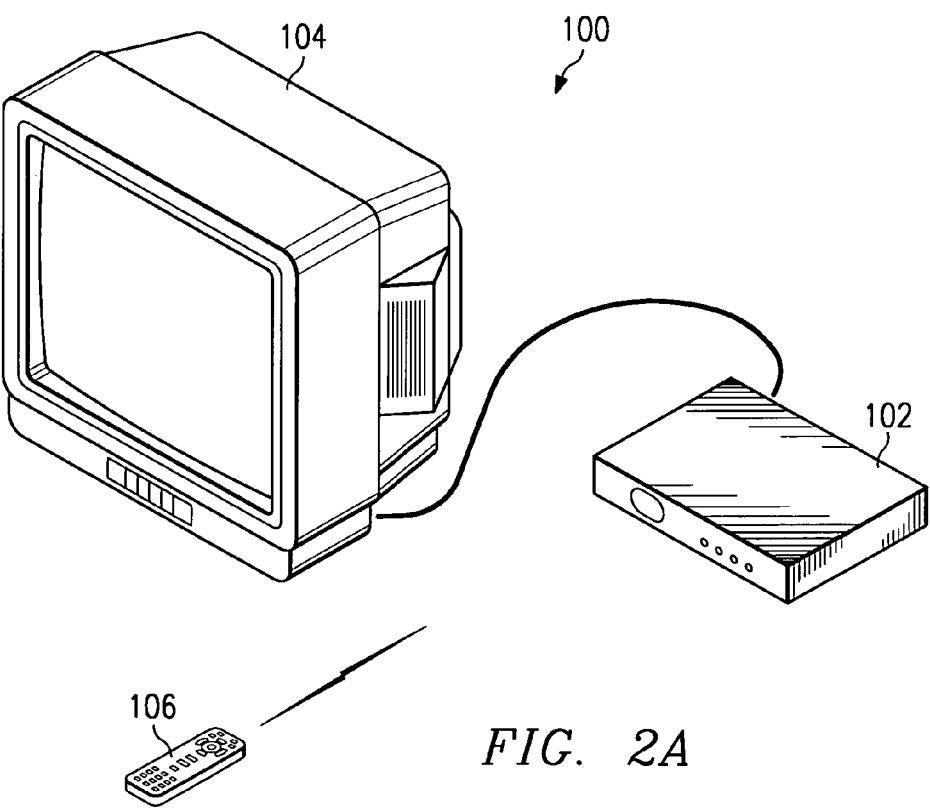
FIG. 2A is pictorial representation of a data processing system unit connected to a conventional television set to form a "Web" appliance.

Alternatively, the Internet client may be a data processing system or a so-called "Web appliance" such as illustrated in FIGS. 2A–2D and 3. FIG. 2A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, which is conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device (such as a mouse, glidepoint, trackball or the like) in conventional personal computers, including the ability to move a cursor on a display and select items.

FIG. 2B is a pictorial representation of the front panel of data processing unit 102. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104 and other infrared remote controlled devices. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

FIG. 2C is a pictorial representation of the rear panel of data processing unit 102. A three wire (ground included) insulated power cord 114 passes through the rear panel. Standard telephone jacks 116 and 118 on the rear panel provide an input to a modem from the phone line and an output to a handset (not shown). The real panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

Figures 2D, 5:
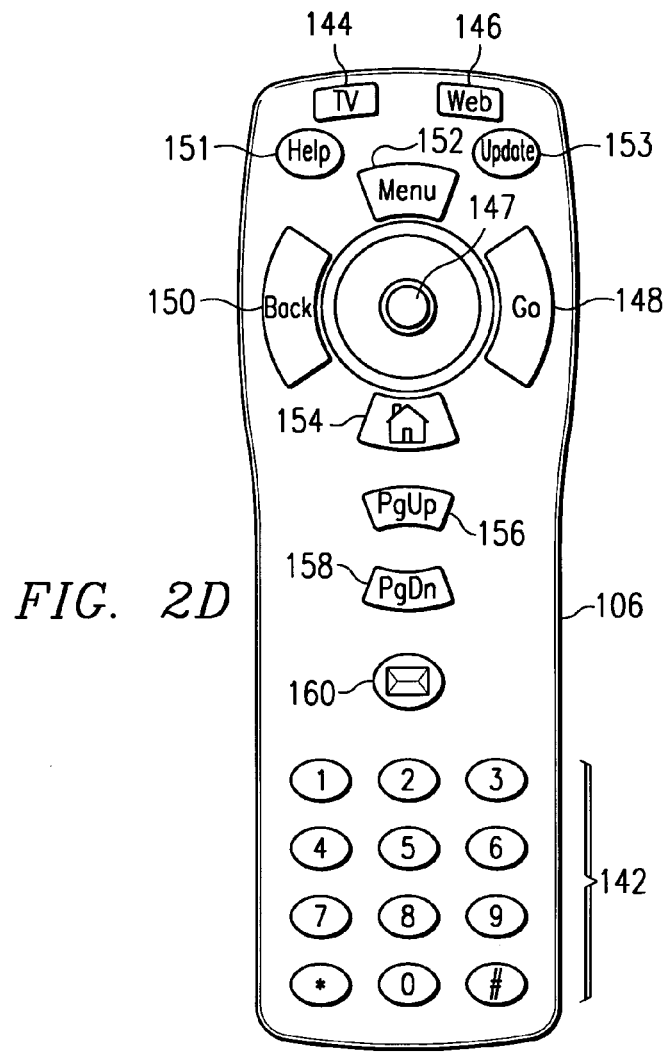
FIG. 2D is a pictorial representation of a remote control unit associated with the data processing system unit.
FIG. 5 is a representative file "profile" according to the present invention.

FIG. 2D is a pictorial representation of remote control unit 106. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. Pressing "Web" button 146 will cause data processing unit 102 to initiate modem dial-up of the user's Internet service provider and display the start-up screen for an Internet browser.

A pointing device 147, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Help" button 151 causes context-sensitive help to be displayed or otherwise provided. "Menu" button 152 causes a context-sensitive menu of options to be displayed, and "Update" button 153 will update the options displayed based on the user's input, while home button 154 allows the user to return to a default display of options. "PgUp" and "PgDn" buttons 156 and 158 allows the user to change the context of the display in display-sized blocks rather than by scrolling. The message button 160 allows the user to retrieve messages.

In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 3:
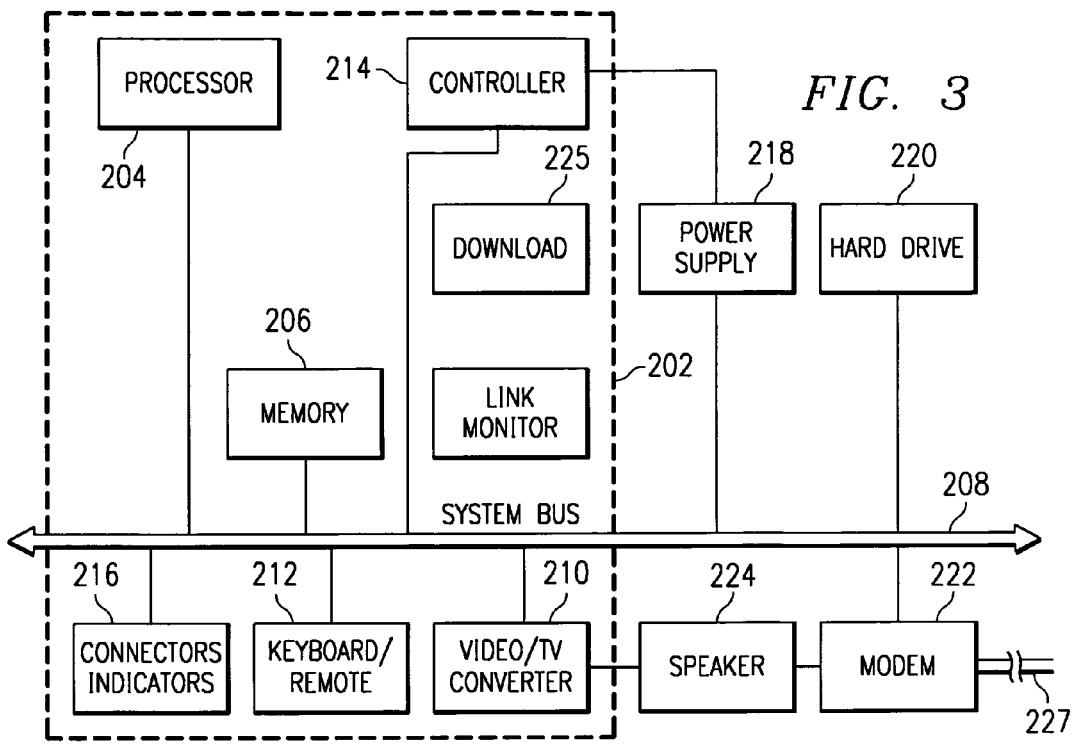
FIG. 3 is a block diagram of the major components of the data processing system unit.

Referring now to FIG. 3, a block diagram for the major components of data processing unit 102 is portrayed. As with conventional personal computers, data processing unit 102 includes a motherboard 202 containing a processor 204 and memory 206 connected to system bus 280. Processor 205 is preferably at least a 486 class processor operating at or above 100 MHz. Memory 206 may include cache memory and/or video RAM. Processor 205, memory 206, and system bus 208 operate in the same manner as corresponding components in a conventional data processing system.

Video/TV converter 210, located on motherboard 202 and connected to system bus 208, generates computer video signals for computer monitors, a composite television signal, and an S-Video signal. The functionality of Video/TV converter 210 may be achieved through a Trident TVG9685 video chip in conjunction with an Analog Devices AD722 converter chip. Video/TV converter 210 may require loading of special operating system device drivers.

Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the function provided by an infrared keyboard.

Connectors/indicators 216 on motherboard 202 provide some of the connections and indicators on data processing unit 102 described above. Other connections are associated with and found on other components. For example, telephone jacks 116 and 118 are located on modem 222. The power indicator within connectors/indicators 216 is controlled by controller 214.

External to motherboard 202 in the depicted example are power supply 218, hard drive 220, modem 222 and speaker 224. Power supply 218 is a conventional power supply except that it receives a control signal from controller 214 which effects shut down of all power to motherboard 202, hard drive 220 and modem 222. In some recovery situations, removing power and rebooting is the only guaranteed method of resetting all of these devices to a known state. Thus, power supply 218, in response to a signal from controller 214, is capable of powering down and restarting data processing unit 102.

Controller 214 is preferably one or more of the 805x family controllers. Controller 214 receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use. As part of the failure recovery system, controller 214 specifies the boot sector selection during any power off-on cycle.

Hard drive 220 contains operating system and applications software for data processing unit 102, which preferably includes IBM DOS 7.0, a product of International Business Machines Corporation in Armonk, N.Y.; an operating system such as Windows 3.1 (or higher), a product of Microsoft Corporation in Redmond, Wash.; and Netscape Navigator (Version 1.0 or higher), a product of Netscape Communications Corporation in Mountain View, Calif. Hard drive 220 also supports a conventional FTP mechanism to facilitate file transfers from Internet FTP sites, all in a known manner. Other conventional Internet tools, including e-mail, bulletin board, and on-line chat capability, may also be provided. Of course, the software identified above is merely representative, as other known programs may be used in the alternative or by way of addition. Also, minor modifications of these software packages may be desirable to optimize performance of data processing unit 102.

Modem 222 may be any suitable modem used in conventional data processing systems, but is preferably a 33.6 kbps modem supporting the V.42bis, V.34, V.17 Fax, MNP 1-5, and AT command sets. TO maintain the slim height of data processing system 102, modem 222 is preferably inserted into a slot mounted sideways on motherboard 202. Modem 222 is connected to a physical communication link 227, which, in turn, in connected or connectable to the Internet (not shown).

Those skilled in the art will recognize that the components depicted in FIGS. 2A–2D and 3 and described above may be varied for specific applications or embodiments. Such variations in which the present invention may be implemented are considered to be within the spirit and scope of the present invention.

According to the invention, a file transfer program 225 run by the processor is used to administer and manage "updating" of the various application programs, preferably without interaction or intervention by a user of the appliance. This piece of code cooperates with program located at a server to facilitate the file transfer download method of the present invention, and it is preferably designed to lay "on top" of a conventional FTP mechanism. According to the invention, an Internet client runs the client component of the download routine while an Internet server runs the server component of the program, and both of these components overlay the FTP mechanism such that the present invention is backwards compatible to existing approaches.

Figure 4:
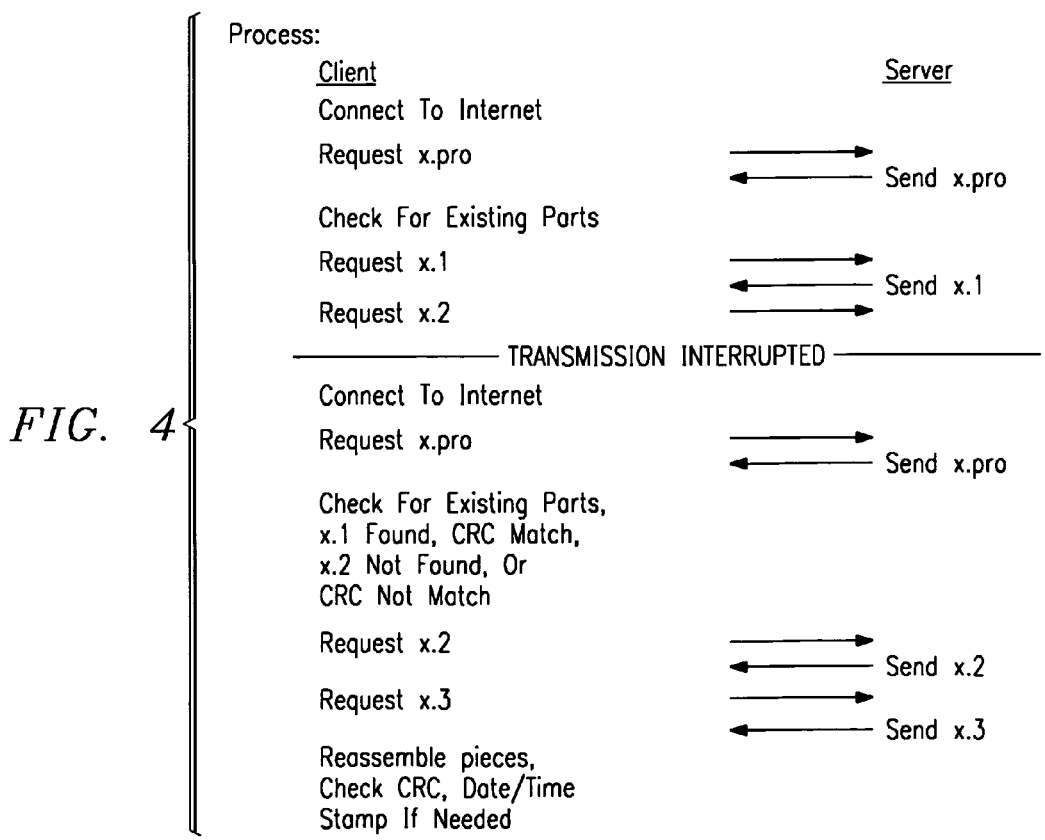
FIG. 4 is a process flow diagram of a preferred method of the present invention for downloading a file from an Internet server to an Internet client such as the Web appliance of FIG. 2A.

The preferred protocol implemented by the client and server components is illustrated in the process flow diagram of FIG. 4. Before discussing this operation in detail, reference should also be made to FIG. 5, which illustrates a representative file "profile" according to the invention. Although not meant to be limiting, each file desired to be transmitted is identified in a master list of files to be downloaded. Preferably, this master list is stored at the Internet server, and it may be accessible by the client. For each file to be downloaded, there is an associated "profile" that is generated. A representative profile 250 for the file titled CONFIG.SYS.PRO is illustrated. The profile includes two primary sections, a header section 252 and a body section 254. Each section includes so-called identifying information useful in deconstructing and constructing the file. Header section 252 includes an identifier CONFIG.SYS for the file and various attributes: a {date/time} attribute identifying a date and time when the profile was created, a {size} attribute indicating the size of the overall file (preferably in bytes), and a cyclic redundancy code {CRC} which acts as a checksum uniquely identifying the file. The {size} is preferably a 32-bit size of the file (unsigned long), and the CRC is a 32-bit CRC. As is known in the art, a CRC may be generated for a particular file (or component thereof) by generating a running count from the hexadecimal or other character strings that comprise the file. The CRC for the overall file is calculated and stored in the profile header section 252. Other checksum approaches may be used in the alternative.

The profile body section 254 includes identifying information for a set of one or more components of the file that (in the preferred embodiment) must be combined or "reassembled" in order to make a working file. In this example, CONFIG.SYS.PRO is made up of three components: CONFIG.SYS1, CONFIG.SYS2 and CONFIG.SYS3. In a representative embodiment, a component is of a fixed size (e.g., up to and including 75K bytes). Of course, this size designation is merely exemplary. Each component includes an identifier and a pair of attributes: {size} and associated {CRC}. These attributes are merely representative as other functional characteristics may be used as well. Thus, for example, a security attribute may be included so that the client does not download a non-usable or bogus file. As noted above, the {size} attribute is preferably a 32-bit size of the file component (unsigned long), and the CRC is a 32-bit CRC calculated for each particular component. This identifying information is used by the client component to verify completeness of the transmission of any component. Preferably, all numeric fields are stored as hexadecimal character strings.

In the preferred embodiment, the profile is generated for each file to be downloaded. This process is preferably done "off-line" (i.e. not during a download session) to save time. The client and server, in effect, "agree" on the naming conventions for the profile by having the server download the profile to the client that is expected to receive the file download. Although not illustrated in detail, it should be appreciated that the server includes an appropriate management and administrative interface (e.g., a DOS-based interface or a Windows-based graphical user interface with control menus and the like) for formatting each file into its components parts. Preferably, a user (which may be a system designer, an administrator, a person familar with protocols or some other third party) merely enters the size and naming conventions into appropriate dialog boxes and the profile (with the {CRC} and other header block information) is generated automatically. The server code also breaks the file into its component parts, and these parts are preferably stored in addressable locations.

Assume now that CONFIG.SYS.PRO file is to be downloaded from the server (at which it is resident) to an Internet client and that the profile 250 is represented by x.pro. The file, for example, may be a new version of an application running on the Web appliance, and it is preferred that this download process by effected without the user's actual knowledge or interaction. The three pieces of CONFIG.SYS.PRO are identified as x.1, x.2 and x.3 in the process flow diagram of FIG. 4 and each of these file components preferably includes its own header in which the associated identifying information is included.

Figure 6:
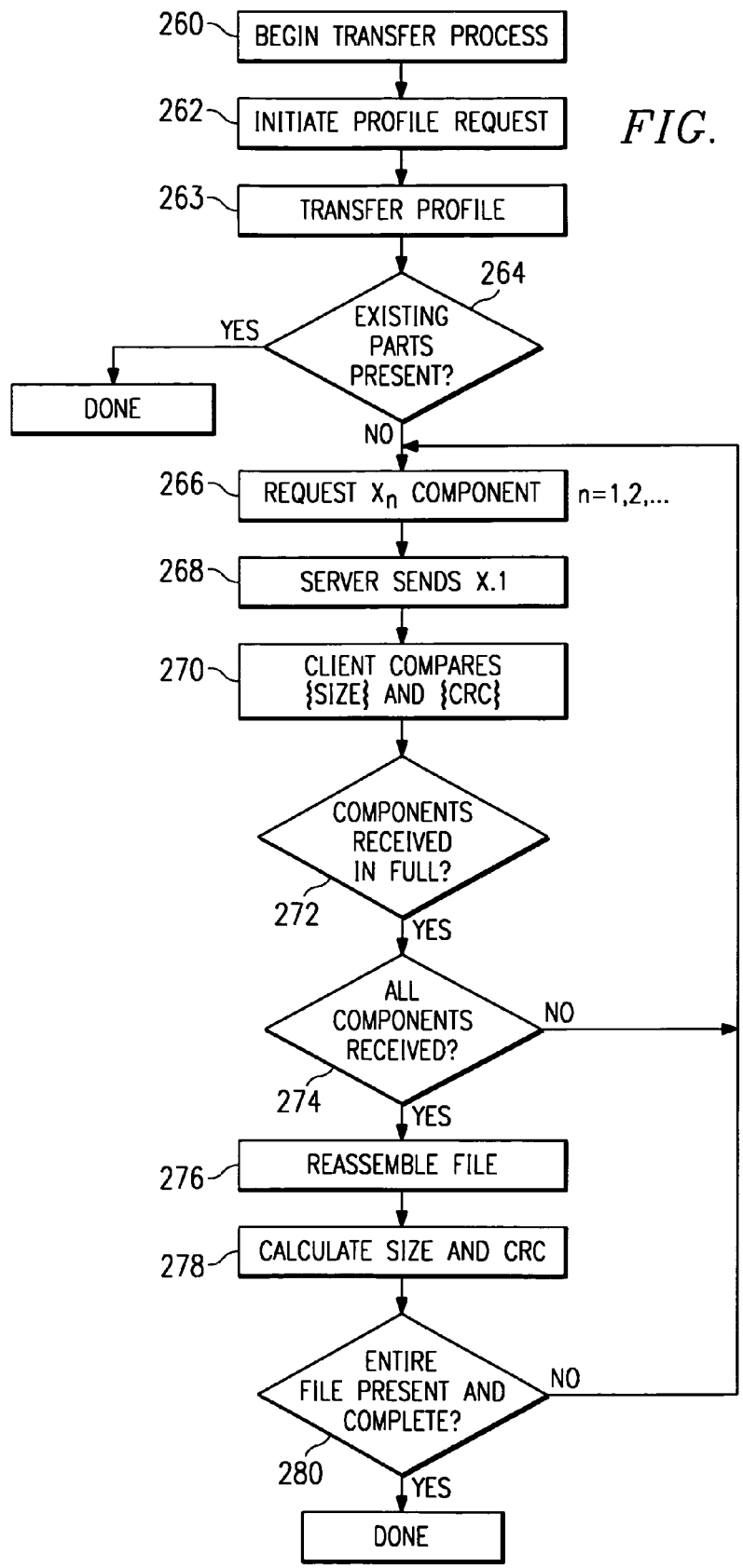
FIG. 6 is a flowchart of the preferred method of the invention.

The protocol begins with the client machine connecting to the Internet, and it is preferred that this protocol overlay a conventional FTP mechanism such that file components are transferred between server and client using FTP. A flow diagram showing the following process steps is illustrated in FIG. 6. The process begins at step 260 in response to some control command(s) from the server indicating that a download session involving the file is about to be initiated. In response, the client initiates a request for the profile (x.pro) and transmits this request to the server. This is step 262 in FIG. 6. The server then sends back the profile x.pro, which is step 263 in FIG. 6. As used herein, "initiating" a request preferably (but not by way of limitation) means an action by the client component of the download routine, not the user of the client machine. Upon receipt of the profile, the client performs a test or check at step 264 in the flowchart to determine whether or not the existing parts or components of the file (as identified in the profile) are present at the client. Although not meant to be limiting, preferably a "checklist" or the like is set up by the client component and evaluated for this purpose. Alternatively, the client component may set up some type of data structure (or other list) to keep track of the profile components. If the outcome of this evaluation is negative, the routine continues at step 266. At this point, the client requests a first component x.1 of the file (as identified by the profile) and transmits this request to the server. At step 268 in the flowchart, the server responds by sending component x.1.

Upon receipt of code purporting to be the first component x.1, the client component preferably compares the {size} and {CRC} information with the identifying information in the profile and records whether the component has downloaded completely. This is step 270. The size and/or CRC comparison may be deferred until all of the pieces are received. The {size} is determined by counting the bytes and the {CRC} is calculated in the known manner. A test is then run at step 272 to determine if the first component x.1 has been received in its entirety (as indicated by the comparison with the profile). If the result of the test at step 272 is positive, the download sequence continues. In particular, a test is performed at step 274 to determine if all of the components have been received. If not, the routine cycles back and repeats for each of the remaining components.

Preferably, the components are transferred from server to client in sequential order but this is not required. The download sequence continues in this fashion (with each received component being checked against the profile identifying information), until all components have been requested by the client and transferred by the server.

When all components have been received, as indicated by a positive result of the test at step 274, the client component reassembles the components at step 276 and then calculates the {size} and {CRC} for the overall file at step 278. A test is then made at step 280 to determine whether the entire file is now present in the client. This is achieved by comparing the calculated information with the identifying information in the profile header block. If the outcome of the test at step 280 is positive, the routine is complete. If the outcome is negative, the routine returns to step 266 to obtain the missing component(s).

Assume now that the file transfer has been interrupted after the client requested component x.2. This is illustrated in the process flow diagram of FIG. 4. A transmission interruption may be caused by any number of factors such as a power outage or the user inadvertently or intentionally turning off the power to the Web appliance. In this circumstance, however, the client again connects to the Internet and requests transfer of the profile x.pro. The server responds by re-sending the profile, which is advantageous because the file may have changed while the client was disconnected. Resending the profile is not always required, however, because there may be situations where the file state is persistent. In the preferred embodiment, however, the profile is retransmitted. The client then checks for the existing parts as previously described. At this point in the example, component x.1 is found, but component x.2 is not found (or its size or CRC does not match the profile identifying information). Thus, the client requests component x.2, and the server responds by sending this component. After validation, the download sequence then continues with the client requesting the next component, x.3 and transmitting this request to the server. The server responds in due course by transferring component x.3. When all pieces of the file have been transferred (and this is determined by analyzing the profile), the client reassembles the pieces, checks the CRC and the date/time stamp if needed, and the process ends.

As can be seen, the present invention is highly advantageous because it obviates retransmission of the entire file if any portion of the transmission is interrupted. Although the process flow of FIG. 4 shows a single transmission interruption, the inventive technique is useful regardless of the frequency of interruptions or the delay associated with any of them. Preferably, file transfer using the inventive scheme takes place "transparently" to the user of the Web appliance, and thus software resident in the appliance can be periodically updated. This makes the appliance easy to use and maintain. Moreover, by overlaying the routine over a conventional FTP mechanism, the individual components of the file are transferred using the existing FTP, and thus the present invention is backwards compatible with existing applications.

Another advantage of the present invention is that the file is broken into a number of components, which enables the transfer of multiple components simultaneously. This can be achieved by opening multiple sockets between the client and the server during a session. Moreover, it should be appreciated that the technique of the present invention is most useful for files greater than about 50 Kbytes in size, and most preferably files greater than 100 Kbytes.

Other modifications and variations are also within the scope of this invention. Thus, for example, a server may be provided with a mechanism that is responsive to a client request for breaking up a composite file into components, creating a profile for the file, and then returning the profile to the client. The remainder of the file transfer would then proceed as described above. This can be accomplished with a new server daemon or by modifying an existing FTP daemon to accept a new FTP site command. A suitable application programming interface (API) may then be provided to facilitate third party use of the server mechanism.

One of the preferred implementations of the file transfer scheme of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Internet client" should be broadly construed to mean any computer or component thereof directly or indirectly connected or connectable in any known or later-developed manner to a computer network, such as the Internet. The term "Internet server" should also be broadly construed to mean a computer, computer platform, an adjunct to a computer or platform, or any component thereof. Of course, a "client" should be broadly construed to mean one who requests or gets the file, and "server" is the entity which downloads the file. It should also be appreciated that the present invention could be used to cache data and programs at a local server serving a set of Internet clients from a master server to conserve network resources.

Having thus described our invention, what we claim as new and desire to secure by Letters Patent is set forth in the following claims.

What is claimed is:

1. A method, in an Internet client, of downloading a download file, consisting of a set of component files, from an Internet server, comprising:

receiving from the server a profile of the download file that includes identifying information for each component file, wherein the identifying information in the profile for each component file includes an identifier, a value indicating a size of the component file, and a code uniquely identifying the component file and wherein the code is a cyclic redundancy code;

initiating a download sequence by which each component file is transferred, one-by-one, from the server using an Internet protocol;

upon interruption of the download sequence, restarting the download sequence with a component file affected by the interruption; and when the download sequence is complete, reassembling the component files into the download file using the identifying information in the profile.

2. A method, in an Internet server, of downloading a download file, consisting of a set of component files, to an Internet client, comprising:

breaking the download file into the set of component files;

generating a profile of the download file that includes identifying information for each component file, wherein the identifying information in the profile for each component file includes an identifier, a value indicating a size of the component file, and a code uniquely identifying the component file and wherein the code is a cyclic redundancy code;

initiating a download sequence by which each component file is transferred, one-by-one, to the client using an Internet protocol; and responsive to any interruption of the download sequence, restarting the download sequence with a component file affected by the interruption.

3. A method, in an Internet client, of downloading a download file, consisting of a set of component files, from an Internet server, the download file represented by a profile that includes identifying information for the download file and for each component file thereof, comprising:

transferring the profile from the server;

initiating a download sequence according to the profile by which each component file is transferred, one-by-one, from the serve using Internet File Transfer Protocol (FTP);

upon receipt of a component file, using the identifying information to verify whether a complete version of the component file has been transferred, wherein the identifying information for the download file includes a code uniquely identifying the download file and wherein the code is a cyclic redundancy code;

if the complete version of the component file has not been transferred, restarting the download sequence with the component file; and when the download sequence is complete, reassembling the component files into the download file and verifying whether a complete version of the download file has been transferred using the identifying information for the download file.

* * * * *

UNITED STATES PATENT AND TRADEMARK OFFICE
CERTIFICATE OF CORRECTION

PATENT NO. : 6,963,923 B1
DATED : November 8, 2005
INVENTOR(S) : Bennett

It is certified that error appears in the above-identified patent and that said Letters Patent is hereby corrected as shown below:

Column 12,
Line 9, after "from the" delete "serve" and insert -- server --.

Signed and Sealed this

Twenty-third Day of May, 2006

JON W. DUDAS
*Director of the United States Patent and Trademark Office*